Aug. 6, 1929.　　　　J. HANSEN　　　　1,723,236
FISHING OTTER
Filed May 18, 1928　　　2 Sheets-Sheet 1
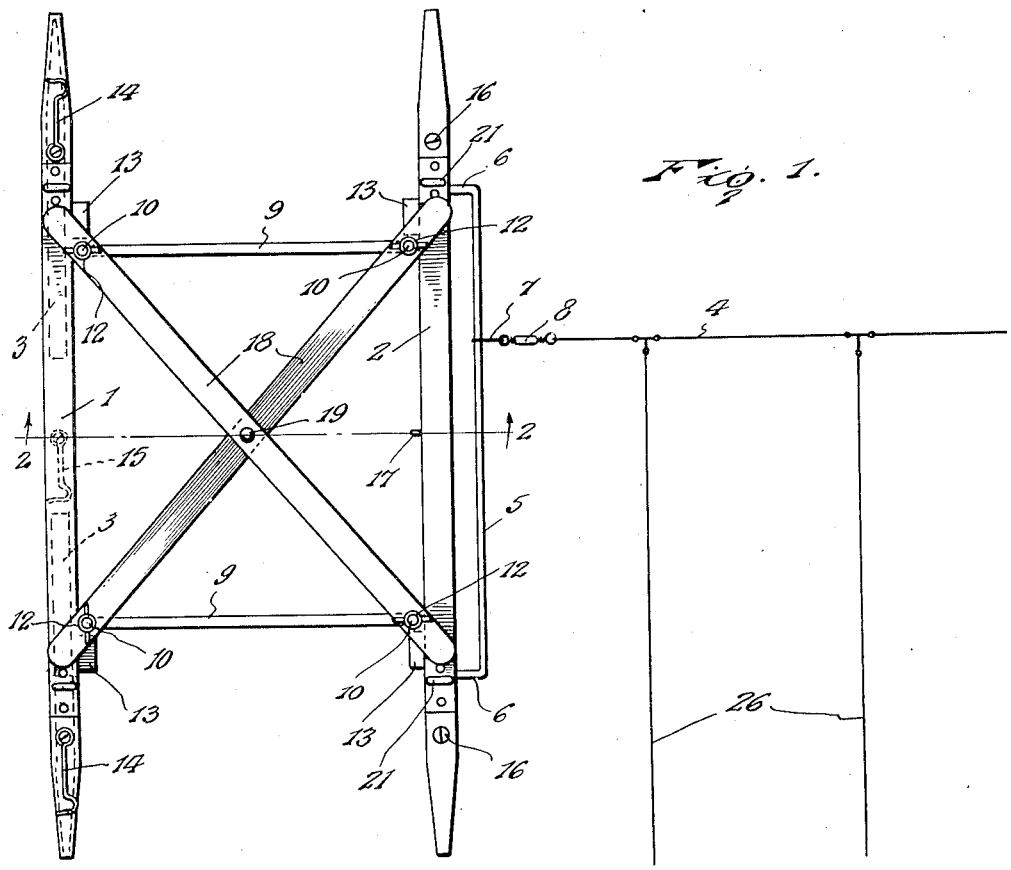
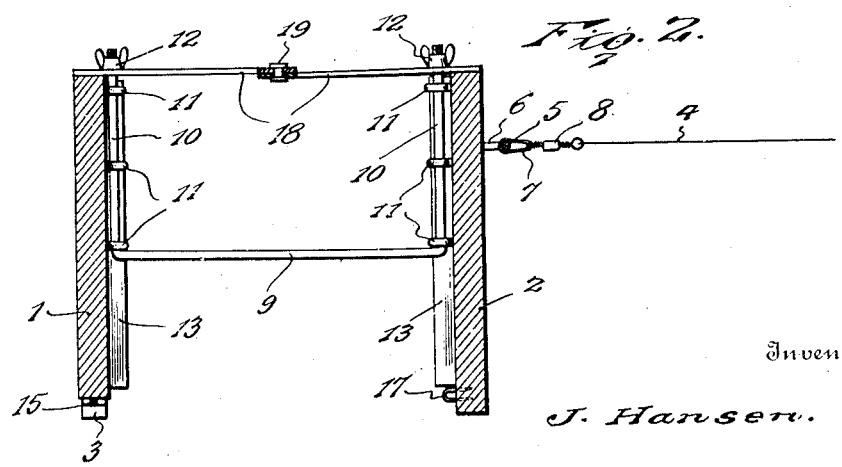
Inventor
J. Hansen.
By Lacey & Lacey, Attorneys Aug. 6, 1929.  J. HANSEN  1,723,236
FISHING OTTER
Filed May 18, 1928  2 Sheets-Sheet 2
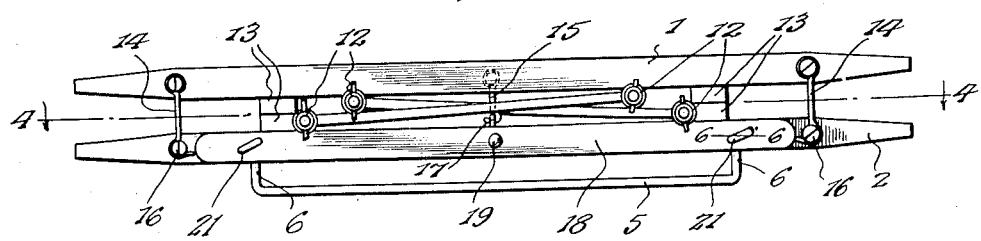
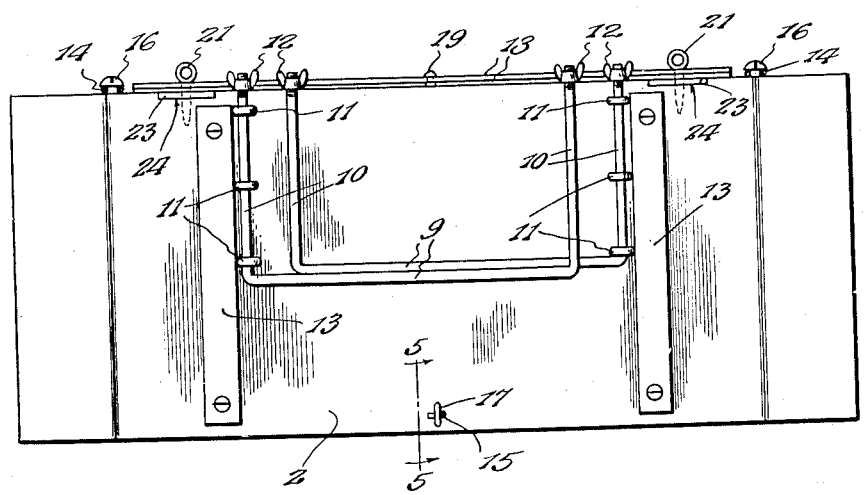
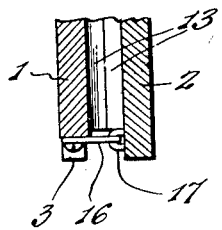
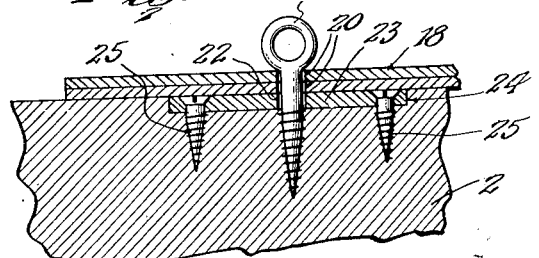
Inventor
J. Hansen.
By Lacey & Lacey, Attorneys Patented Aug. 6, 1929.

1,723,236

UNITED STATES PATENT OFFICE.

JOHN HANSEN, OF MISSOULA, MONTANA.

FISHING OTTER.

Application filed May 18, 1928. Serial No. 278,832.

This invention relates to fishing and trapping and more particularly to a device known as an otter and intended to be attached to a fishing line so that the line to which a number of leaders carrying hooks are attached may be drawn outwardly in a body of water as the person holding the line and unreeling it walks along the shore.

The present embodiment of the invention is an improvement over that shown in my prior Patent, No. 1,642,582, issued September 13, 1927.

One object of the invention is to provide an otter of the double float type which may be reduced to a compact mass when not in use and may be easily and quickly assembled prior to its use.

Another object of the invention is to so form the companion floats that when in an inoperative position they may be secured together in close proximity to each other and braces which retain them spaced from each other when in use folded and held against the connected floats.

Another object of the invention is to so form the braces which retain the floats in spaced relation to each other when in an operative position that they will be releasably connected therewith and when applied will serve very effectively to prevent the floats from having movement relative to each other and thus prevent them from moving out of proper relation to each other.

The invention is illustrated in the accompanying drawings, wherein

Figure 1 is a top plan view of the improved otter ready for use;

Fig. 2 is a vertical transverse sectional view through the otter taken on the line 2—2 of Fig. 1;

Fig. 3 is a top plan view showing the otter reduced to its inoperative position;

Fig. 4 is a longitudinal sectional view taken on the line 4—4 of Fig. 3 and showing one of the floats in elevation;

Fig. 5 is a fragmentary sectional view taken on the line 5—5 of Fig. 4, and

Fig. 6 is a fragmentary sectional view taken on the line 6—6 of Fig. 3.

The improved otter consists of companion floats, indicated in general by the numerals 1 and 2 respectively. These floats are similar to each other in construction and may be formed of wood, hollow metal or of any substance having sufficient buoyancy to float in water. They are relatively narrow, as shown in Fig. 2, and taper towards their ends, as shown in Figs. 1 and 3, so that they may easily move through the water in either direction. Metal strips 3 are secured against the under face of the float 1 and constitute weights which will cause this float to be submerged deeper in the water than the float 2 and thereby cause the otter to assume a canted position when in use. In order to connect the line 4 with the otter, there has been provided a yoke or rod 5 which extends longitudinally of the float 2 in spaced relation to its outer side face and at its ends is provided with arms 6 which extend towards the float and are rigidly secured thereto in any desired manner. It will thus be seen that the hook 7 which is connected with the line 4 by a swivel 8 and is engaged with the yoke rod 5 may have movement longitudinally of the float and assume a position at either end of the rod according to the direction in which the person holding the line walks along the shore.

In order to connect the floats and space them the desired distance apart when assembled, there has been provided cross bars 9 which are preferably formed of metal and have their end portions bent to provide upstanding stems 10 which are circular in cross section and are loosely received in the eyes 11 carried by the floats and projecting from their inner side faces. These stems are of such length that their upper ends project above the floats and their upper ends are threaded so that winged nuts 12 may be applied to them. By this arrangement the cross bars or yokes 9 will be pivotally and releasably connected with the floats and by removing the appropriate nuts they may be slid out of the eyes carried by one float and folded against the float to which they remain attached, as shown in Fig. 4, so that the two floats may be disposed close to each other, as shown in Fig. 3, and thereby reduce the otter to a compact mass when not in use. It will be obvious that, if so desired, each float could have one yoke released from it and the other remain in engagement with it so that, when disposed as shown in Fig. 3, one yoke will be carried by each float. Spacing strips 13 are secured vertically against the inner faces of the floats in spaced relation to their ends and close to the eyes, as shown in Fig. 4, and these spacing strips are intended to contact with each other, as shown in Fig. 3, so that, while the floats may be firmly secured in close proximity to each other, ample space will be provided between them to receive the folded yokes. Hooks 14 and 15 are carried by the float 1 and pivotally connected therewith by screws or other suitable fasteners and are intended to be swung into latching engagement with screws 16 and an eye or staple 17 carried by the float 2 in order to securely but releasably retain the two floats in close proximity to each other when the otter is in its folded inoperative position. By this arrangement the two floats may be firmly held in engagement with each other but permitted to be easily released when the otter is to be set up for use.

When the otter is assembled and the stems of the two yokes engaged in the eyes 11, it is necessary to brace the floats in order to prevent them from swinging longitudinally about the stems and thereby moving out of proper spaced relation to each other. In order to do so, there has been provided bracing bars 18 which are formed of flat strips of metal pivotally connected by a rivet 19. Therefore, the bracing bars may be swung about the rivet to assume a position in crossed relation to each other and by removing the securing nuts 12 the upper ends of the stems may be passed through openings 20 formed adjacent the ends of the bracing bars and the nuts replaced. The bracing bars will then be engaged with the upper ends of the yoke stems, as shown in Fig. 1, and since these cross bars have their ends engaged with the stems and their intermediate portions connected by the rivet 19 they will serve very effectively to prevent the floats from having any movement relative to each other. When the otter is taken apart and reduced to its inoperative folded position, the bracing bars are removed from the stems after the nuts have been taken off and the bracing bars are then swung into overlying relation to each other, as shown in Fig. 4, and are placed against the upper edge of the float 2 where they are secured by screw eyes 21 which are passed through the alined openings 20 and other openings 22 formed in protecting plates 23 secured in recesses 24 formed in the float by screws or other suitable fasteners 25 and screwed into the float, as shown in Fig. 6. By this arrangement the bracing bars will be securely but releasably connected with the float 2 when the otter is not in use and there will be no danger of their becoming misplaced.

It will be obvious that each of the floats may be provided with the plates 23 and screw eyes 21, as shown in Fig. 1, or they may be only applied to one float.

When the otter is in use, it is first set up, as shown in Fig. 1, and the hook 7 of the line 4 is engaged with the yoke or rod 5. The otter is placed in the water and as the operator walks along the shore and unreels the line the otter will move outwardly due to the fact that it will assume a slanting position. The line 4 carries leaders 26 which are spaced from each other longitudinally of the line and each of these leaders carries a hook. It will thus be seen that the hooks will be spaced from each other across as wide a stretch of water as the length of the line 4. If so desired, a light may be applied to the float 2, as shown in my prior patent, in order to attract the fish at night time. When the line and otter are drawn back to the shore, the otter is removed from the water and can be very easily taken apart and reduced to the compact mass shown in Fig. 3. When so reduced, it can be stored in a small space or easily carried.

Having thus described the invention, I claim:

1. An otter comprising companion floats, bracing means to retain the floats spaced transversely from each other extending between the floats and releasably held in pivotal engagement with the floats, the said bracing means when released from one float being adapted to be folded against the inner face of the other float, other bracing means to retain the floats spaced from each other and prevent movement of the floats and first bracing means relative to each other, and means carried by one float for engagement by a trolling line.

2. An otter comprising companion floats, bracing means to retain the floats spaced transversely from each other extending between the floats and releasably held in pivotal engagement with the floats, the said bracing means when released from one float being adapted to be folded against the inner face of the other float, means to releasably secure the floats in side by side relation to each other with the bracing means between them when released, and means for attaching a trolling line to one float.

3. An otter comprising companion floats, bracing means to retain the floats spaced transversely from each other extending between the floats and releasably held in pivotal engagement with the floats, the said bracing means when released from one float being adapted to be folded against the inner face of the other float, spacers projecting from the inner faces of said floats and adapted to contact and provide space between the floats for the bracing means when the bracing means is released from one float and folded against the second float, means to releasably secure the floats in close proximity to each other with their spacers contacting, and means for attaching a trolling line to one float.

4. An otter comprising companion floats, bracing means to retain the floats in transverse spaced substantially parallel relation to each other pivotally connected with one float, means to releasably connect said bracing means with the other float, the said bracing means when released from the second float being adapted to be folded close against the first float, other braces pivoted to each other intermediate their ends and adapted to be disposed in crossed relation to each other diagonally between the floats with their ends releasably secured and serving to prevent movement of the floats relative to each other, and means for connecting a trolling line with one float.

5. An otter comprising companion floats, bracing bars extending between said floats and having upstanding stems at their ends, eyes projecting from the inner faces of said floats and loosely receiving said stems to pivotally and releasably connect the bracing bars with the floats, removable fasteners carried by the upper ends of said stems, other bracing bars extending between said floats and removably received upon the upper ends of said stems and releasably secured thereon by said fasteners, and means to releasably secure the floats in close proximity to each other when the second bracing bars are removed and the first bracing bars are released from one float and folded against the inner surface of the other float.

6. An otter comprising companion floats disposed in transverse spaced relation to each other when in an operative position, means to releasably join the floats in close proximity to each other when in an inoperative position, spacing strips projecting from the inner faces of said floats, the strips of each float being spaced from each other longitudinally of the float and contacting with the strips of the other float when the floats are joined in the inoperative position, braces to retain the floats spaced from each other when in the operative position pivoted to one float and releasably connected with the other and adapted to be folded against the first float between the spacing strips when the floats are in an inoperative position, and other bracing means for the floats when in an operative position adapted to be releasably engaged with the first bracing means.

7. An otter comprising companion floats disposed in transverse spaced relation to each other when in an operative position, means to releasably join the floats in close proximity to each other when in an inoperative position, spacing strips projecting from the inner faces of said floats, the strips of each float being spaced from each other longitudinally of the float and contacting with the strips of the other float when the floats are joined in the inoperative position, braces to retain the floats spaced from each other when in the operative position having stems at their ends pivotally and releasably connected with the floats and having free ends projecting above the floats, other braces for the floats when in an operative position having openings in their ends to receive the upper ends of said stems, and removable fasteners engageable with the upper ends of the stems to retain the first and second-mentioned braces in an operative position.

8. An otter comprising companion floats disposed in transverse spaced relation to each other when in an operative position, means to releasably join the floats in close proximity to each other when in an inoperative position, spacing strips projecting from the inner faces of said floats, the strips of each float being spaced from each other longitudinally of the float and contacting with the strips of the other float when the floats are joined in the inoperative position, braces to retain the floats spaced from each other when in the operative position pivoted to one float and releasably connected with the other and adapted to be folded against the first float between the spacing strips when the floats are in an inoperative position, other bracing means for the floats when in an operative position adapted to be releasably engaged with the first bracing means, and means carried by one float to engage the second bracing means and hold the same in engagement therewith when released from an operative position.

9. An otter comprising companion floats disposed in transverse spaced relation to each other when in an operative position, means to releasably join the floats in close proximity to each other when in an inoperative position, spacing strips projecting from the inner faces of said floats, the strips of each float being spaced from each other longitudinally of the float and contacting with the strips of the other float when the floats are joined in the inoperative position, braces to retain the floats spaced from each other when in the operative position having stems at their ends pivotally and releasably connected with the floats and having free ends projecting above the floats, other braces for the floats when in an operative position having openings in their ends to receive the upper ends of said stems, removable fasteners engageable with the upper ends of the stems to retain the first and second-mentioned braces in an operative position, and fasteners carried by one float and adapted to be passed through the openings in the ends of the second braces to releasably secure the same when released from the first braces.

10. An otter comprising companion floats disposed in transverse spaced relation to each other when in an operative position, means to releasably join the floats in close proximity to each other when in an inoperative position, spacing strips projecting from the inner faces of said floats, the strips of each float being spaced from each other longitudinally of the float and contacting with the strips of the other float when the floats are joined in the inoperative position, and braces to retain the floats spaced from each other when in the operative position releasably connected therewith and adapted to be disposed between the intermediate portions of the floats when the floats are in the inoperative position.

In testimony whereof I affix my signature.

JOHN HANSEN. [L. S.]